United States Patent [19]

Kawamura et al.

[11] Patent Number: 5,222,570

[45] Date of Patent: Jun. 29, 1993

[54] VEHICLE TRACTION CONTROL DEVICE

[75] Inventors: Makoto Kawamura, Hiroshima; Toshiaki Tsuyama, Higashi-Hiroshima; Masao Hideshima; Kensuke Hayafuchi, both of Hiroshima, all of Japan

[73] Assignee: Mazda Motor Corporation, Hiroshima, Japan

[21] Appl. No.: 724,208

[22] Filed: Jul. 1, 1991

[30] Foreign Application Priority Data

Jun. 29, 1990 [JP] Japan .................................. 2-171891

[51] Int. Cl.⁵ .......................................... B60K 28/16
[52] U.S. Cl. ...................................... 180/197; 73/105; 364/424.05; 364/426.02
[58] Field of Search .................... 180/197; 364/424.05, 364/426.02; 73/105; 307/10.1

[56] References Cited

U.S. PATENT DOCUMENTS

| | | | |
|---|---|---|---|
| 4,651,290 | 3/1987 | Masaki et al. | 73/105 |
| 4,912,967 | 4/1990 | Shiraishi et al. | 73/105 |
| 4,984,163 | 1/1991 | Kuwana et al. | 73/105 |
| 5,070,960 | 12/1991 | Nobumoto et al. | 364/426.02 |
| 5,085,288 | 4/1992 | Shiraishi et al. | 180/197 |

FOREIGN PATENT DOCUMENTS

| | | |
|---|---|---|
| 3519549 | 12/1985 | Fed. Rep. of Germany . |
| 3912865 | 11/1989 | Fed. Rep. of Germany . |
| 3836680 | 5/1990 | Fed. Rep. of Germany . |
| 64-29636 | 1/1989 | Japan . |

Primary Examiner—Mitchell J. Hill
Attorney, Agent, or Firm—Keck, Mahin & Cate

[57] ABSTRACT

A vehicle traction control device having a control device for controlling the torque of the drive wheels by controlling the throttle in order to match the slip rate of the drive wheels with a target slip rate in order to prevent excessive slip caused by excessive torque in the drive wheels. The traction control is provided with a device for determining whether or not the road being driven on is a rough road or not. When the above device sends a signal to the control that the road is rough, the engine gain in the throttle is made smaller when the throttle closed relative to the engine gain and throttle of a normal road. In another embodiment, when the road is rough, the engine gain is made larger when the throttle is opened relative to the engine gain and throttle of a normal road. Also disclosed is a control in which the engine gain in the throttle control is made larger when the throttle is opened and is made smaller when the throttle is closed relative to the engine gain and throttle of a normal road. A process for controlling traction is also disclosed.

18 Claims, 4 Drawing Sheets

VEHICLE TRACTION CONTROL DEVICE

BACKGROUND OF THE INVENTION

1. Field of the Invention

The present invention relates to a traction control for a vehicle which controls the torque of the drive wheels of a vehicle by controlling the throttle in order to match the slip rate of the drive wheels with a target slip rate in order to prevent excessive torque in the drive wheels due to an excessive slip rate. The present invention also relates to a method of controlling traction in a vehicle.

2. Description of the Prior Art

When the slip rate of the drive wheels of a vehicle becomes excessive due to excessive torque in the drive wheels, sufficient driving force in the vehicle cannot be achieved, the ability to accelerate deteriorates, the cornering ability of the vehicle deteriorates, and skidding occurs.

Prior art traction controls are known in which, in order to prevent excessive slip caused by excessive torque in the drive wheels of the vehicle, the torque of the drive wheels is controlled by calculating an actual slip rate, and matching the actual slip rate to a specially-determined, prescribed, target slip rate by throttle control or brake control.

Moreover, it is known in the art to carry out traction control by determining whether or not the driving surface is a rough one with much unevenness such as a gravel road, etc., and then, if the road is rough, effecting the most suitable control by appropriately differing the control elements from the traction control on a usual (not rough) road.

A rough road detection device used in a traction control, etc., is disclosed in Japanese Unexamined Patent Publication No. Sho 64-29636, laid open to the public in 1989.

The above-mentioned throttle control for controlling drive wheel torque is based on the value of the drive wheel slip rate which in turn depends on the usual vehicle wheel speed (the rotational speed of the wheels).

However, the wheel speed changes according to the unevenness of the road surface of a rough road, and the above-mentioned slip rate also fluctuates and the slip rate signal contains noise. As a result, a slip rate which is not that great is erroneously determined to be increasing and the throttle is closed in order to reduce the drive wheel torque.

Nevertheless, because the driving resistance is great on rough roads, when the throttle is closed—even though the slip rate is not that high—due to the erroneous determination of slip rate, the torque of the drive wheels is thus decreased so that the vehicle tends to lose speed because of the undue decrease in driving force. Even if the throttle is subsequently opened, the recovery from the loss in speed is delayed.

As a consequence, it is desirable, when driving on rough roads, to prevent the above loss in speed due to the closing of the throttle caused by fluctuations in the speed of the wheels, or to come up with a measure for quickly recovering from such a loss in speed.

SUMMARY OF THE INVENTION

It is therefore an object of the present invention to provide a traction control device which prevents loss of speed when driving on rough roads as described above, or enables quick recovery from the loss of speed.

One embodiment of the present invention achieves the above object by providing a vehicle traction control device having a control device for controlling the torque of the drive wheels by controlling the throttle in order to match the slip rate of the drive wheels with a target slip rate in order to prevent excessive slip caused by excessive torque in the drive wheels. The embodiment is characterized in that the traction control is provided with a device for determining whether or not the road being driven on is a rough road. When the above device sends a signal to the control that the road is rough, the engine gain in the throttle control is made smaller when the throttle is closed relative to the engine gain for of a usual road.

In a second embodiment of the invention, when the road is rough, the engine gain is made larger when the throttle is opened relative to the engine gain for a usual road.

In a third embodiment of the invention, when the road is rough, the engine gain in the throttle control is made larger when the throttle is opened and is made smaller when the throttle is closed relative to the engine gain for usual road.

Making the engine gain in the throttle control larger when the throttle is being closed relative to the engine gain for a usual road, means that relative to a usual road (a not rough road) the throttle is slowly closed. In short, the closing speed is being made smaller or the equivalent. Making the engine gain in the throttle control larger when the throttle is being opened means that relative to a usual road, the throttle is opened more quickly. In short, the opening speed is made greater or the equivalent.

The value of the slip rate can be any kind of numerical indication of the degree of slip of the drive wheels. For example, one may use the decrease in speed from the drive wheels to the passive wheels.

Further objects, features, and advantages of the present invention will become apparent from the Detailed Description of the Preferred Embodiments which follows, when considered together with the attached drawings.

DESCRIPTION OF THE PREFERRED EMBODIMENTS

In the first embodiment of the present invention, because the throttle valve is closed slowly on rough roads compared to usual roads, the decrease in torque caused by the throttle valve becomes gradual. In this manner, the loss of speed is suppressed, the degree of loss of speed is made smaller, and thereafter, the recovery from loss of speed when the throttle is opened is speeded up.

In the second embodiment of the present invention, because the throttle is opened more quickly on rough roads when compared with usual roads, the maximum torque of the drive wheels caused by the opening of the throttle valve is quickly achieved. Thereby, acceleration reaches a maximum, recovery from loss of speed quickly takes place, and the loss of speed is ameliorated.

The third embodiment of the present invention, closes the throttle valve slowly and opens the valve quickly on rough roads relative to usual roads, and, by having both of the operations of the first two embodiments, efficiently ameliorates the loss of speed.

As follows, a preferred embodiment of the present invention will be explained in more detail with reference to the figures.

The embodiment controls the slip of the drive wheels with a control unit UTR or control means which (1) reduces engine torque by means of a throttle control which reduces the opening of the throttle, and (2) provides brake force to the drive wheels by means of a brake control.

Figure 1:
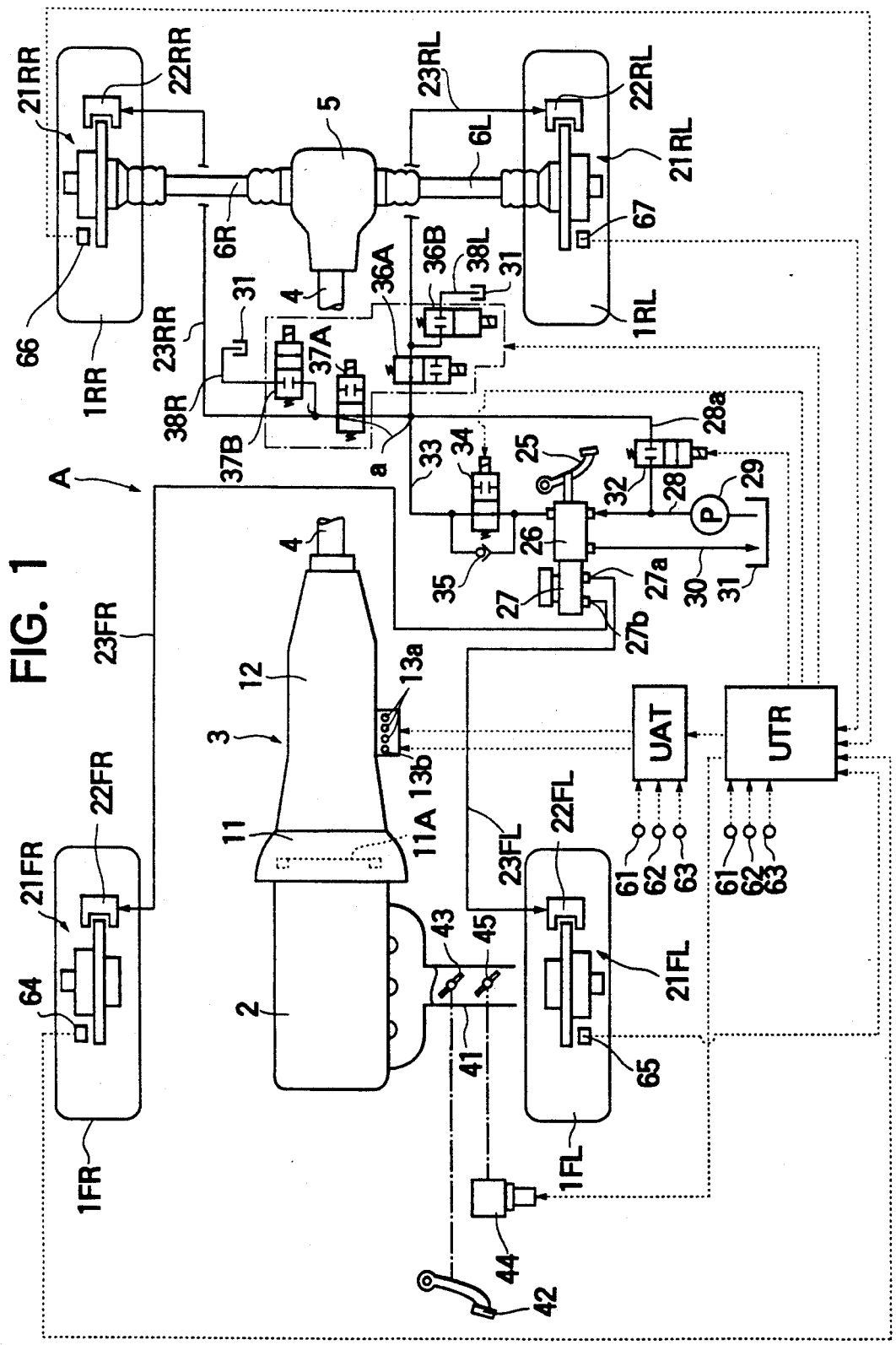
FIG. 1 is a plan schematic view of an automobile provided with one embodiment of the present invention.

In FIG. 1, A is a vehicle provided with a traction control according to the present invention. In vehicle A, the left and right front wheels 1 FL, 1 FR are passive wheels and the left and right rear wheels 1 RL, 1 RR are drive wheels. The torque produced by the engine 2 mounted in the front of the vehicle, after passing through the automatic transmission 3, the propeller shaft 4, and the differential gear 5, is transmitted to the left rear wheel 1 RL by left drive axle 6 L, on the one hand, and transmitted to right rear wheel 1 RR by right drive axle 6 R.

Construction of the Automatic Transmission

The above automatic transmission 3 comprises a torque converter 11 and a multispeed gear mechanism 12. Speed changes are effected by activating and inactivating a plurality of solenoids 13a incorporated in the hydraulic circuit of gear mechanism 12. Torque converter 11 has a hydraulically actuated lock-up clutch 11A. The lock-up clutch 11A is engaged and disengaged by means of activating and inactivating the solenoids 13b incorporated into the hydraulic circuit of the clutch 11A.

The above solenoids 13a, 13b are controlled by means of the automatic transmission control unit UAT. The control unit UAT effects speed change and lockup control in a known manner by storing the speed change and lock-up characteristics in advance.

The following signals, to be explained below, are inputted into the control unit UAT in order to effect the control: the main throttle opening signal from the sensor 61 which determines the opening of the main throttle 43; the subthrottle opening signal from sensor 62 which determines the opening of the subthrottle 45; the wheel speed signal from the sensor 63 which determines the wheel speed (in the preferred embodiment the latter is a signal of the rotation of the propeller shaft 4).

Construction of the Mechanism for Adjusting the Brake Fluid Pressure

Each of the wheels 1 FR, 1 FL, 1 RR, 1 RL is provided with a respective brake 21 FR, 21 FL, 21 RR, 21 RL. Each of the brakes 21 is provided with a respective brake cylinder 22 FR, 22 FL, 22 RR, 22 RL which in turn is supplied with brake fluid by means of a line 23 FR, 23 FL, 23 RR, 23 RL.

The mechanism for supplying each of the brakes 21 with brake fluid is as follows. Firstly, the treading force on the brake pedal 25 is multiplied by means of a force multiplying device utilizing a hydraulic booster 26. The force is then transmitted to a tandem-type master cylinder 27. The hydraulic fluid transmitted to the master cylinder 27 is transmitted to the left front wheel brake 21 FL by means of brake line 23 FL connected to the number one discharge vent 27a of the master cylinder. The fluid is transmitted to the right front wheel brake 21 FR by means of brake line 23 FR connected to the number two discharge vent 27b of the master cylinder 27.

The operating hydraulic fluid for the force multiplier 26 is supplied from pump 29 over line 28. Excess operating fluid is returned to reserve tank 31 over return line 30. Branch line 28a branches from above line 28 Electromagnetic closing valve 32 is connected to branch line 28a. Line 33 branches off from force multiplier 26. In line 33, electromagnetic closing valve 34 and one-way valve 35 are connected in parallel.

Branch line 28a and line 33 flow together at confluence point a. Brake lines 23 RL, 23 RR for the left and right rear wheels are connected to confluence point a. Electromagnetic closing valves 36A and 37A are connected to lines 23 RL, 23 RR, respectively. Downstream of valves 36A, 37A electromagnetic closing valves 36B, 37B serve as outlet valves in the respective relief paths 38 L, 38 R.

The above-mentioned valves 32, 34, 36A, 37A, 36B, 37B are controlled by the control unit UTR for the traction control. For example, when brake or slip control is not taking place, as is indicated in the figure, valve 32 is closed, valve 34 is opened, and valves 36B, 37B are closed and valves 36A, 37A are opened. In this case, when the break pedal is tread on, front wheel brakes 21 FR, 21 FL are supplied with brake fluid by means of master cylinder 27. With respect to the rear wheel brakes, the working fluid of the force multiplier 26 is supplied as brake fluid over line 33

As is described below, when slip rate of the rear drive wheels 1 RR, 1 RL increases with respect to the road surface and brake or slip control takes place, valve 34 is closed and valve 32 is opened. The maintenance, increase and decrease of brake fluid pressure is effected by means of the duty ratio control of valves 36A, 36B, 37A, and 37B. Specifically, assuming valve 32 is closed, (1) when each of the valves 36A, 36B, 37A and 37B is closed, the fluid pressure is maintained; (2) when valves 36A and 37A are opened and valves 36B and 37B closed, the pressure increases; and (3) when valves 36A and 37A are closed and valves 36B and 37B are opened the pressure decreases. The brake fluid pressure in branch line 28a does not exert a counter force against the brake pedal 25 because of the functioning of one-way valve 35.

In this manner when slip control is carried out by means of brake control, if the brake pedal is treaded on, the rear wheels brakes 21 RR, 21 RL are supplied with brake fluid over one-way valve 35 by means of the working pressure of the force multiplier caused by treading on the pedal.

Construction of the Device for Regulating the Engine Torque

The above-described control unit UTR, effects the below throttle control along with the already mentioned brake control. In the air intake path 41 of the engine, in addition to the main throttle 43 connected to the accelerator peddle, a subthrottle 45 connected to an actuator 44 is provided for regulating the opening of the throttle. The subthrottle 45 is controlled by the control unit UTR by means of the actuator 44. In other words, where as here the main throttle 43 and the subthrottle 45 are provided in series, the opening of the throttle is rate-limited by the least open of the two throttle valves. Therefore, by controlling the opening of the subthrottle valve 45, one can suitably reduce the torque of the engine.

Construction of the Control Unit

During slip control, the control unit UTR used for traction control effects brake control by means of controlling valves 32, 34, 36A, 36B, 37A, 37B, and controls the throttle by means of controlling the throttle-regulating actuator 44. The following signals are inputted into the control unit UTR: signals from the sensors 64–67 which determine the speed of each of the wheels; the main throttle opening signal from sensor 61 which determines the opening of the main throttle; the subthrottle opening signal from the sensor 62 which determines the opening of the subthrottle; and the speed signal from the speed sensor 63.

The control unit is provided with an input interface for entering each of the signals from the above sensors; a microcomputer comprising a CPU, a ROM and a RAM; an output interface; and drive circuits for driving valves 32, 34, 36A, 37A, 36B, 37B and actuator 44. The ROM stores various maps and control programs necessary for the traction control. The RAM contains various memories necessary for executing the control.

Elements of the Slip Control

The elements of the slip control carried out by the control unit UTR will be explained below.

Slip control is controlling the torque of the drive wheels so that the slip rate of the drive wheels matches the target slip rate when the above actual slip value of the drive wheels exceeds (or appears to exceed) the specially established target slip rate.

The slip control according to the preferred embodiment, is effected by both throttle control and brake control. For each of the above controls, a slip value of the drive wheels is calculated and a target slip rate and a control start threshold value are established.

The speed of the passive wheels subtracted from the speed of the drive wheels is used as the slip value of the drive wheels. More specifically, the slip value used for the throttle control is the average speed of the left and right drive wheels minus the average speed of the left and right passive wheels. The slip rate for the brake control and the control itself are effected individually with respect to the left and right drive wheels. For the left drive wheel, the brake control slip rate is the speed of the left drive wheel minus the average speed of the left and right passive wheels. For the right drive wheel, the brake control slip rate is the speed of the right drive wheel minus the average speed of the left and right passive wheels.

The above separately established slip rates are the throttle control target slip rate value STA, and the brake control target slip rate value STB. The above threshold values are the lower threshold value VSPB and the upper threshold value VSPA (VSPA > VSPB).

The above throttle control and brake control are outlined as follows. The throttle control slip rate and the brake control slip rate are calculated based on the speed of each of the wheels inputted from the wheel speed sensors 64–67. The target slip values STA and STB and the threshold values VSPA and VSPB are established according to maps stored in the control unit UTR and based on for example the road surface $\mu$, the steering wheel angle, and the acceleration stroke which are obtained from various switches and sensors not shown in the drawings. If the above slip rates for the throttle control and brake control increase and exceed the lower threshold value VSPB the throttle control and brake control are initiated. Throttle control is a feedback control of the subthrottle 45 by means of the actuator 44 so as to make the throttle control slip rate value match the target slip rate STA. Brake control is a feedback control of the brake fluid pressure to the rear drive wheels 1 RR, 1 RL by means of valves 36A, 36B, 37A, 37B, so as to match the brake control slip rate of the drive wheels with the target slip value STB. If the slip rate continues to rise in spite of the above brake and throttle control, and the slip rate reaches the upper threshold value VSPA, a feed-forward control is effected by quickly reducing the throttle opening to a specially established throttle quick-reduction value SM. Thereafter, from the quick-reduction throttle value, feedback control takes place.

The above throttle and brake controls are carried out based on two factors: (1) the rate of change of the slip rate of the drive wheels over time; and (2) the difference between the slip rate of the drive wheels and the target slip rate.

Usual Control and Bad Road Control

As follows, the throttle control of the slip control of the present invention will be explained with respect to usual road and rough road control.

In the throttle control of the present invention, it is determined whether the driving road is a rough one or not (a usual road) by means of the rough road detection means or device. In the case of a usual road, the opening and closing control (usual road control) of subthrottle valve 45 takes place with a predetermined speed established for good roads. In the case of a rough road, a control is carried out in which the subthrottle valve is closed at a predetermined speed slower than the above speed for the usual road, and, at the same time, the subthrottle valve 45 is opened at a predetermined speed faster than the speed for the usual road.

Figure 2:
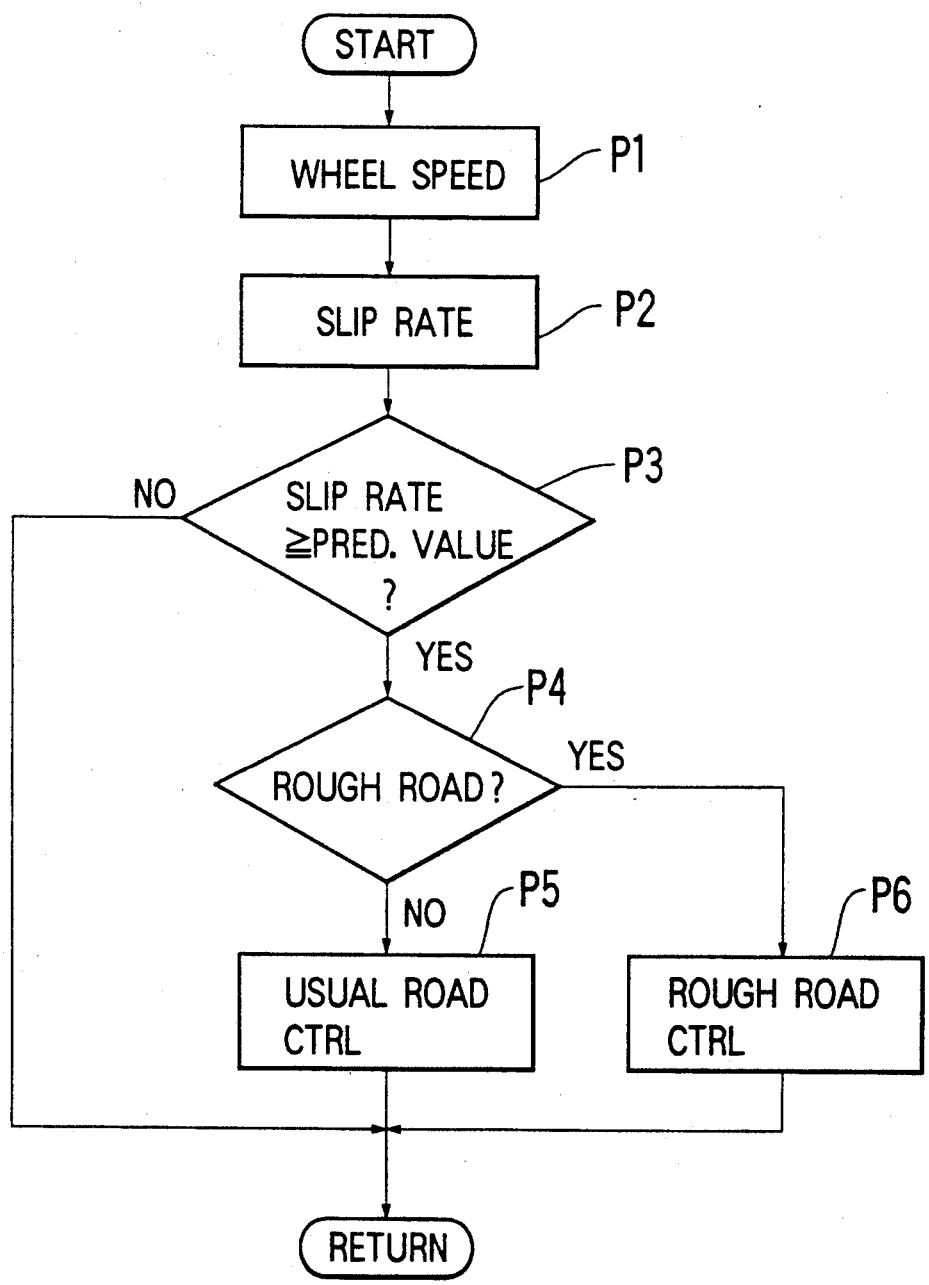
FIG. 2 is a flow chart showing the control elements of one embodiment of the present invention.

In other words, as is shown in FIG. 2, the speed of each of the wheels is entered at P1. At P2, the slip rate of the drive wheels is calculated from the speed of each of the wheels. At P3, it is determined whether or not the slip rate of the drive wheels is greater than or equal to a predetermined value (in the preferred embodiment, the lower threshold value VSPB). If less than the predetermined value, the vehicle continues to run as is and the process returns to P1. If greater than or equal to the predetermined value, throttle control is entered.

In such a throttle control, first it is determined whether or not the road is rough, and if the road is not rough, that is, in the case of a usual road, the usual control is carried out at P5. In the case of a rough road, rough road control is carried out at P6 in which the subthrottle valve is opened more quickly relative to usual control and closed more slowly relative to usual control.

A specific example of usual road control and rough road control will be explained with reference to Table 1 and Table 2.

TABLE 1

| EN (Km/h) | DEN (G) −3.0 | −2.0 | −1.0 | −0.5 | −0.25 | +0.25 | +0.5 | +1.0 | +2.0 | +3.0 |
|---|---|---|---|---|---|---|---|---|---|---|
| −10 | PB | PB | PB | PB | PB | PB | PB | ZO | ZO | ZO |
| −5 | PB | PB | PB | PB | PB | PB | PB | ZO | ZO | ZO |
| −2 | PM | PM | PM | PM | PM | PM | PS | ZO | ZO | ZO |
| −1 | PM | PM | PM | PS | PS | PS | PS | ZO | ZO | ZO |
| −0.5 | PM | PS | PS | PS | PS | PS | ZO | ZO | ZO | ZO |
| +0.5 | PS | PS | PS | PS | PS | ZO | ZO | ZO | ZO | NS |
| +1 | ZO | ZO | ZO | ZO | ZO | ZO | NS | NS | NS | NS |
| +2 | ZO | ZO | ZO | NS | NS | NS | NS | NS | NS | NM |
| +5 | NS | NS | NS | NS | NS | NM | NM | NM | NM | NB |
| +10 | NM | NM | NM | NM | NM | NM | NB | NB | NB | NB |
|  | NB | NB | NB | NB | NB | NB | NB | NB | NB | NB |

Table 1 shows a control zone map for the throttle control. As is indicated in the map, the present throttle control is a control using both differential control (control based on the degree of change DEN of the slip value) and proportional control (control based on the difference EN between the slip rate and the target slip rate). The control zones PB, PM, etc., are established by means of DEN and EN.

EN and DEN are calculated according to the following formulas:

$$EN(K) = SE(K) - [WFN(K) + STA]$$

$$DEN(K) = [SE(K) - WFN(K)] - [SE(K-1) - WFN(K-1)]$$

In the above formulas, (K) is the present cycle in the process flow, (K-1) is the previous cycle, SE is the average drive wheel speed, WFN is the average passive wheel speed, and STA is the above throttle control target slip value. The control zones PB, PM and PS are large, medium and small degrees of opening, respectively. ZO means maintaining a constant opening. NB, NM and NS mean large medium and small degrees of closing.

Once the control zones based on the map in Table 1 are determined, the opening and closing speeds of the subthrottle valve 45 can be determined based on the opening and closing speed map shown in Table 2.

The opening and closing of the subthrottle valve 45 is controlled according to the thus determined control zones and opening and closing speeds.

TABLE 2

| CTRL ZONE | AKR | SPEED (%/sec) |
|---|---|---|
| PB | 1 | 35.8 |
|  | 0 | 8.7 |
| PM | 1 | 8.7 |
|  | 0 | 4.4 |
| PS | 1 | 3.5 |
|  | 0 | 1.7 |
| ZO |  | 0.0 |
| NS | 1 | −1.3 |
|  | 0 | −1.7 |
| NM | 1 | −3.5 |
|  | 0 | −4.4 |
| NB | 1 | −6.5 |
|  | 0 | −11.0 |

In the above Table 2, AKR 1 indicates a rough road and AKR 0 a usual road. As is indicated in Table 2, when the subthrottle is opened (PB, PM, PS), it is opened with a faster speed on rough roads relative to usual roads. When the subthrottle is closed (NS, NM, NB), it is closed with a slower speed on rough roads relative to usual roads.

The Bad Road Determination

As follows, the rough road determination device will be explained. One may use any suitable device capable of determining whether or not the road is rough (a road surface in which there are many irregularities and the speed of the wheels fluctuates). For example, one may use a suspension stroke sensor, or an up and down G force sensor to detect wheel vibrations due to irregularities in the road surface and to determine whether the road is rough or not. The present embodiment is constructed with control unit UTR, and employs a device or means for determining whether the road is rough or not based on the vibration of the vehicle wheels.

The steps employed in such a rough road determination will be explained with reference to FIG. 3.

On a rough road, the vehicle wheels vibrate due to the unevenness of the road surface. Due to these vibrations, fluctuations in the speed of the wheels is observed. According to the fluctuations in speed, fluctuations in the change in speed over time (the vehicle wheel acceleration) are also observed. When the device determines that, within a predetermined period of time, the amplitude of fluctuations in the vehicle acceleration (the change in wheel acceleration with time) exceeds a predetermined threshold value $\alpha$, and that the frequency is greater than a predetermined threshold value $\beta$, a determination is made that the road is rough.

The subject of the above determination can be either the left and right front or rear wheels, but the example which follows explain the case in which the left and right front wheels are used.

Figure 3:
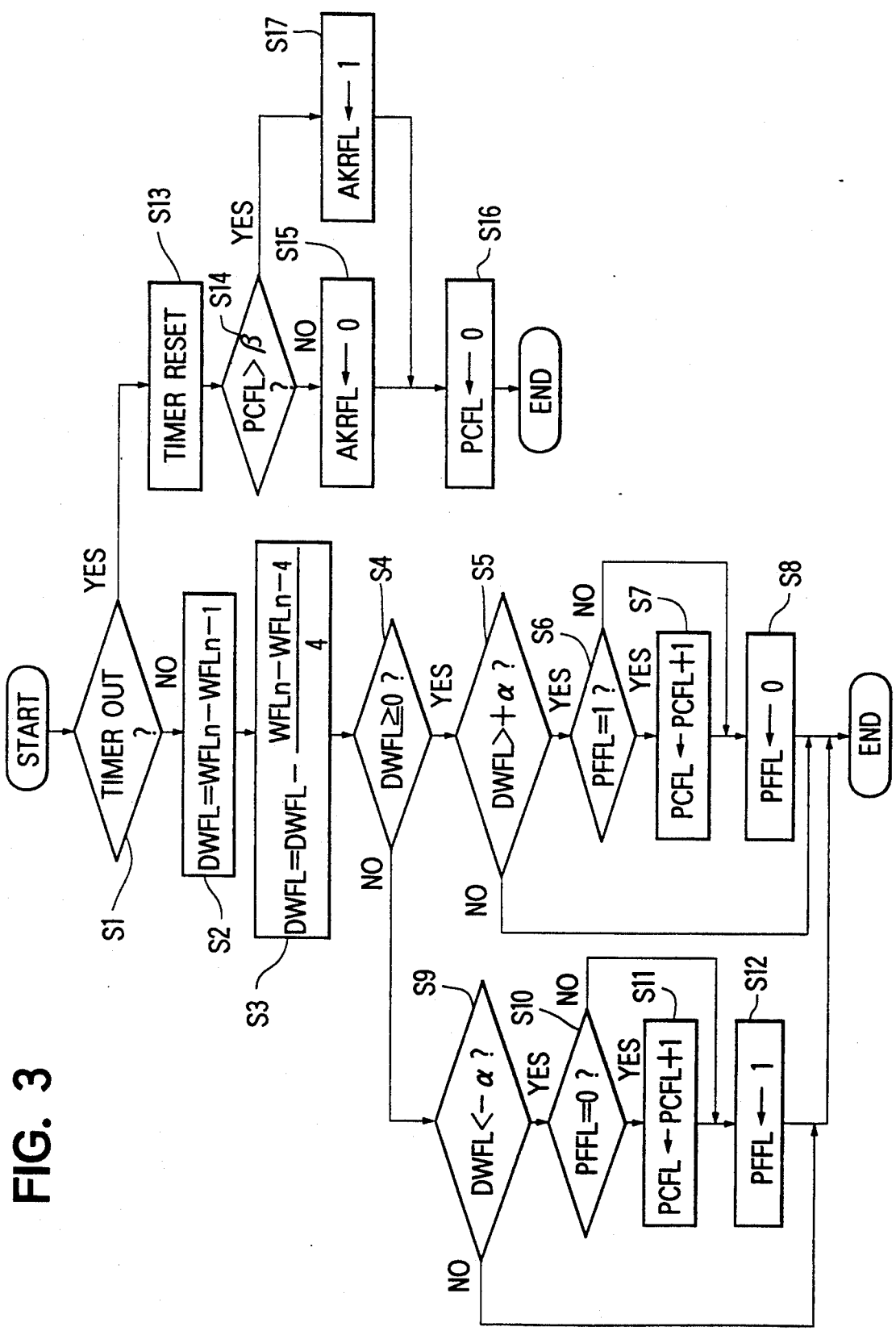
FIG. 3 is a flow chart of the road determining arrangement of the present invention.

FIG. 3 is a flow chart showing the steps in the rough road determination for the left front wheel. Following the flow chart, firstly, at S1 it is determined whether or not the timer is greater than or equal to a predetermined value, in short, whether an already-established predetermined time period (for example, 0.7 s) has passed or not. At S2, if the time period has not passed, the acceleration DWFL of the left front wheel is calculated. The calculation of DWFL is arrived at by subtracting the present left front wheel speed $WFL_n$ from the previous left front wheels speed $WFL_{n-1}$.

$$DWFL = WFL_n - WFL_{n-1}$$

Thereafter, at S3, an offset correction for the left front wheel acceleration is made based on the following formula:

$$DWFL = DWFL - (WFL_n - WFL_{n-4})/4$$

This offset correction arrives at the above-mentioned true wheel acceleration. That is, the actual wheel acceleration arrived at in S2 includes the acceleration of the vehicle body. Accordingly, subtracting the vehicle body acceleration from the actual wheel acceleration effects an offset correction in which the true wheel acceleration is arrived at. In the above formula, the body acceleration is expressed as $(WFL_n - WFL_{n-4})/4$. Considering the relationship between the wheel and the vehicle body, it is clear that first the wheel begins to turn and then the body begins to move. In other words, the body movement is delayed with respect to the vehicle wheel. This delay in the preferred embodiment is equivalent to about 4 cycles in the rough road determination flow chart (in a flow process cycle of 14 ms, the delay of the vehicle body with respect to the wheels is 56 ms). Therefore, the vehicle body acceleration is taken to be the average actual wheel acceleration from the present until four cycles from now.

Figure 4:
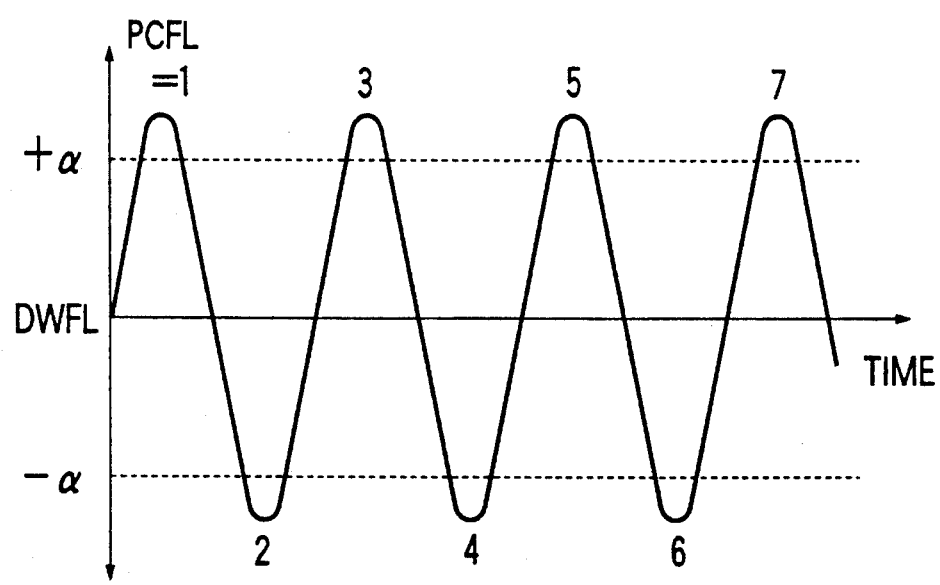
FIG. 4 shows the oscillation of the vehicle wheel acceleration in a vehicle.

Continuing in the flow chart, the frequency PCFL (left front wheel peak count) is counted with which the peaks of the true wheel acceleration DWFL arrived at in S3 exceed an already established predetermined value $\alpha$. In other words, if the oscillations of DWFL are shown in FIG. 4, the frequency with which the peaks of the oscillation of DWFL exceeds $+\alpha$ and $-\alpha$ is counted. As indicated if FIG. 4, the number PCFL is peaks which alternately exceed $+\alpha$ and $-\alpha$. Therefore if a first peak exceeds $+\alpha$, and if the next peak does not exceed $-\alpha$ and then exceeds $+\alpha$ again, the second $+\alpha$ peak is not counted. In the case of oscillations in wheel acceleration due to a rough road one would expect alternate fluctuations in the $(+)$ and $(-)$ directions. Accordingly, by counting only when $-\alpha$ and $+\alpha$ are alternately exceeded, a rough road determination of high accuracy can be carried out.

Specifically, in S4, it is determined whether the DWFL of S3 is greater than or equal to 0. If greater than or equal to 0, it is determined in S5 whether or not DWFL is greater than $+\alpha$. If not greater than $+\alpha$, the process is ended. If greater than $+\alpha$, it is determined at S6 whether or not the left front wheel peak flag PFFL is 1 or not. If PFFL is 1 it means that because DWFL exceeded $-\alpha$ the previous time the PCFL counted once. If PFFL is 0, it means that because the DWFL exceeded $+\alpha$ the previous time the PCFL counted once. Therefore, if PFFL is 1, and the PCFL counted once because $-\alpha$ was exceed the previous time, this time at S7 when $+\alpha$ is exceeded the PCFL counts once and 1 is added to the PCFL. Thereafter, at S8, the PFFL becomes 0 and the process is ended. If at S6 the PFFL is not 1 then both in the previous time and at the present $+\alpha$ is exceeded. In order to prevent one peak from being counted twice, even though the $(-)$ side of the previous cycle was not counted, and in order to prevent the $(+)$ side to be counted one more time, the process continues to S8 without the PCFL being counted and the process is ended.

At S4, if DWFL is less than 0, it is determined at S9 whether the DWFL is smaller than $-\alpha$ or not. If not less, the process is ended. If less, then process steps based on the same logic as S6–S8 are carried out. That is, firstly, at S10, it is determined whether or not PFFL is 0 or not. If 0, then PCFL is counted once at S11. Next, the PFFL is made 1 at S12 and the process is ended. If PFFL is not 0 at S10, then the process continues without counting the PCFL to S12 and is ended.

The above steps S1–S12 are repeated. If the predetermined time period has been exceeded the step S1 will determine whether the timer is greater than the predetermined value, for this reason, the process continues to S13 and the timer is reset. At S14 it is determined whether PCFL is greater than the already established predetermined value $\beta$ (for example, $\beta=10$). If not greater, then, at S15, the left front wheel rough road flag AKRFL is made 0, and at S16, the PCFL is made 0 and the process is ended. If in S14 PCFL is greater than $\beta$, at S17 the left front wheel rough road flag is made 1, and the process continues to S16 where it is ended.

The above is an explanation of how the rough road determination flows with respect to the left front wheel but the rough road determination can take place in completely the same way for the right front wheel. Therefore, the ultimate decision of whether the road is rough or not may be appropriately made for example when both of the rough road flags for the left and right front wheels are 1, or when either one of the left and right front wheel rough road flags is equal to 1.

Furthermore, the above threshold values $\alpha$, $\beta$, and whether the left and right front wheels or the rear wheels are made as the subject of the determination can be established or changed taking various considerations into account.

In the above preferred embodiment, when there is a rough road, when the throttle control is operated, the throttle closes with a smaller speed relative to a usual road and opens with a greater speed relative to a usual road. Accordingly, because the throttle closes more slowly, the decrease in torque due to the closing of the throttle valve occurs more gradually, the loss of speed which occurs frequently on rough roads when the throttle is closed is suppressed. Because the degree of loss of speed is made smaller, the subsequent recovery from loss of speed when the throttle is opened is quicker. In addition, because the throttle is opened more quickly on rough roads, the maximum torque of the drive wheels due to the opening of the throttle is achieved quickly, and the loss of speed is ameliorated due to the quick recovery.

Although the preferred embodiment comprises closing more slowly and opening more quickly, either alone may also be carried out. Even if only one of the two is carried out, as is described above, the loss of speed can be sufficiently inhibited or ameliorated.

The deleterious effect of the fluctuation in wheel speed is greater in the case of differential control, accordingly, at least where differential control is carried out, the present invention may be advantageously applied.

As is stated in detail above, in the first, second and third embodiments of the present invention the throttle valve is (1) closed at a slower speed on a rough road relative to a usual road, (2) opened at a faster speed on a rough road relative to a usual road, (3) or both closed at a slower speed and opened at a faster speed. Each of the above embodiments suppresses or ameliorates the loss of speed due to throttle closing which frequently occurs when on rough roads.

While the present invention has been explained by means of several preferred embodiments, one of ordinary skill in the art will recognize that modifications and improvements may be made while remaining within the scope and spirit of the present invention. The scope of the present invention is determined solely by the appended claims.

What is claimed is:

1. A traction control device for a vehicle, comprising:
an engine having a variable position throttle;
detecting means for detecting whether or not a road driven on by he vehicle is a rough road; and
control means for controlling the rate of change of the throttle position so as to match an actual slip rate with a target slip rate;
wherein when the detecting means detects a rough road, the rate of change of the throttle position is made smaller upon closing of the throttle by the control means than the rate of change of the throttle position when a rough road is not detected by the detecting means.

2. A device according to claim 1, wherein the rate of change of throttle position is made smaller by decreasing the speed with which the throttle closes compared to a speed with which the throttle is closed when a rough road is not detected.

3. A device according to claim 1, wherein the detecting means comprises a suspension stroke sensor.

4. A device according to claim 1, wherein the detecting means comprises a G force sensor.

5. A traction control device for a vehicle, comprising:
an engine having a variable position throttle;
detecting means for detecting whether or not a road driven on by he vehicle is a rough road; and
control means having means for controlling the rate of change of the throttle position so as to match an actual slip rate with a target slip rate;
wherein when the detecting means detects a rough road, the rate of change of the throttle position is made larger upon opening of the throttle by the control means than the rate of change of the throttle position when a rough road is not detected by the detecting means.

6. A device according to claim 5, wherein the rate of change of throttle position is made larger by increasing the speed with which the throttle opens compared to a speed with which the throttle is opened when a rough road is not detected.

7. A device according to claim 5, wherein the detecting means comprises a suspension stroke sensor.

8. A device according to claim 5, wherein the detecting means comprises a G force sensor.

9. A traction control device for a vehicle, comprising:
an engine having a variable position throttle;
detecting means for detecting whether or not a road driven on by he vehicle is a rough road; and
control means for controlling the rate of change of throttle position so as to match an actual slip rate with a target slip rate;
wherein when the detecting means detects a rough road, the rate of change of the throttle position is made larger upon opening of the throttle by the control means than the rate of change of the throttle position when a rough road is not detected by the detecting means, and the rate of change of the throttle position is made smaller upon closing of the throttle by the means for controlling than the rate of change of throttle position when a rough road is not detected by the detecting means.

10. A device according to claim 9, wherein the rate of change of throttle position is made smaller by decreasing the speed with which the throttle closes compared to a speed with which the throttle is closed when a rough road is not detected, and wherein the rate of change of throttle position is made larger by increasing the speed with which the throttle opens compared to a speed with which the throttle is opened when a rough road is not detected.

11. A device according to claim 9, wherein the detecting means comprises a suspension stroke sensor.

12. A device according to claim 9, wherein the detecting means comprises a G force sensor.

13. A method for controlling traction in a vehicle, comprising the steps of:
detecting whether or not a road driven by the vehicle is a rough road;
controlling an engine having a variable position throttle by control of the rate of change of throttle position so that an actual slip rate matches with a target slip rate; and
making the rate of change of throttle position smaller upon closing of the throttle when a rough road is detected in comparison with the rate of change of throttle position when a rough road is not detected.

14. A method according to claim 13, wherein the step of detecting comprises repeatedly calculating an acceleration for a wheel, and when said wheel acceleration fluctuates between a predetermined positive and negative threshold value, a rough road is detected.

15. A method for controlling traction in a vehicle, comprising the steps of:
detecting whether or not a road driven by the vehicle is a rough road;
controlling an engine having a variable position throttle by control of the rate of change of throttle position so that an actual slip rate matches with a target slip rate; and
making the rate of change of throttle position larger upon opening of the throttle when a rough road is detected in comparison with the rate of change of throttle position when a rough road is not detected.

16. A method according to claim 15, wherein the step of detecting comprises repeatedly calculating an acceleration for a wheel, and when said wheel acceleration fluctuates between a predetermined positive and negative threshold value, a rough road is detected.

17. A method for controlling traction in a vehicle, comprising the steps of:
detecting whether or not a road driven by the vehicle is a rough road;

controlling an engine having a variable position throttle by control of the rate of change of throttle position so that an actual slip rate matches with a target slip rate;

making the rate of change of throttle position larger upon opening of the throttle when a rough road is detected in comparison with the rate of change of throttle position when a rough road is not detected; and making the rate of change of throttle position smaller upon closing of the throttle in comparison with the rate of change of throttle position when a rough road is not detected.

18. A method according to claim 17, wherein the step of detecting comprises repeatedly calculating an acceleration for a wheel, and when said wheel acceleration fluctuates between a predetermined positive and negative threshold value, a rough road is detected.

* * * * *